US012735103B2

(12) United States Patent
Nitta et al.

(10) Patent No.: US 12,735,103 B2
(45) Date of Patent: Sep. 15, 2026

(54) CONTROL DEVICE FOR ARTICULATED VEHICLE

(71) Applicants: JTEKT CORPORATION, Kariya (JP); J-QuAD DYNAMICS INC., Tokyo (JP)

(72) Inventors: Nobuhiro Nitta, Tokyo (JP); Hirotaka Tokoro, Tokyo (JP)

(73) Assignees: JTEKT CORPORATION, Kariya (JP); J-QuAD DYNAMICS INC., Tokyo (JP)

(*) Notice: Subject to any disclaimer, the term of this patent is extended or adjusted under 35 U.S.C. 154(b) by 112 days.

(21) Appl. No.: 18/840,755

(22) PCT Filed: Feb. 7, 2023

(86) PCT No.: PCT/JP2023/004005
§ 371 (c)(1),
(2) Date: Aug. 22, 2024

(87) PCT Pub. No.: WO2023/162677
PCT Pub. Date: Aug. 31, 2023

(65) Prior Publication Data

US 2025/0178668 A1 Jun. 5, 2025

(30) Foreign Application Priority Data

Feb. 28, 2022 (JP) ................................ 2022-029269

(51) Int. Cl.
*B62D 13/06* (2006.01)
*B60D 1/24* (2006.01)
(Continued)

(52) U.S. Cl.
CPC ............. *B62D 13/06* (2013.01); *B60D 1/245* (2013.01); *B60W 30/18036* (2013.01);
(Continued)

(58) Field of Classification Search
None
See application file for complete search history.

(56) References Cited

U.S. PATENT DOCUMENTS 9,522,699 B2 * 12/2016 Raad ...................... B62D 6/002
2012/0271512 A1 * 10/2012 Rupp .................. B62D 15/027
701/1

(Continued)

FOREIGN PATENT DOCUMENTS

CN 119365375 A * 1/2025 ............ B60D 1/245
DE 102005043467 A1 * 3/2007 ............ B60N 2/753

(Continued)

OTHER PUBLICATIONS

May 14, 2025 Extended European Search Report issued in European Patent Application No. 23759681.2.

(Continued)

*Primary Examiner* — Kevin R Steckbauer
(74) *Attorney, Agent, or Firm* — Oliff PLC

(57) ABSTRACT

A combination vehicle includes a tractor including a steered wheel and a trailer towed by the tractor. A control device for the combination vehicle includes a control unit. The control unit is configured to, when a reverse operation of the combination vehicle is performed, assist a reverse operation of the trailer by causing a controlled variable to follow a target value of reverse control that is set through a specific operation by an operator. The control unit is configured to execute a process of limiting the target value and a process of limiting a time rate of change in the target value from a viewpoint of suppressing occurrence of a jackknife phenomenon.

3 Claims, 6 Drawing Sheets

(51) Int. Cl.

*B60T 7/12* (2006.01)
*B60W 30/18* (2012.01)
*B62D 15/02* (2006.01)

(52) U.S. Cl.

CPC ....... *B62D 15/027* (2013.01); *B62D 15/0285* (2013.01); *B62D 15/029* (2013.01); *B60T 7/122* (2013.01); *B60T 2230/08* (2013.01); *B60W 2520/22* (2013.01); *B60W 2720/22* (2013.01)

(56) References Cited

U.S. PATENT DOCUMENTS

| | | | | |
|---|---|---|---|---|
| 2016/0229451 | A1* | 8/2016 | Raad | B62D 15/027 |
| 2020/0001920 | A1* | 1/2020 | Hejase | B60W 30/18036 |
| 2020/0164919 | A1* | 5/2020 | Cotter | B62D 15/025 |
| 2021/0206213 | A1* | 7/2021 | Matsushita | B60R 11/04 |
| 2024/0239409 | A1* | 7/2024 | Tokoro | B62D 6/002 |
| 2025/0178668 | A1* | 6/2025 | Nitta | B62D 13/06 |

FOREIGN PATENT DOCUMENTS

| | | | | | |
|---|---|---|---|---|---|
| DE | 102005043468 | A1 | * | 3/2007 | B62D 13/06 |
| DE | 102016101070 | A1 | * | 8/2016 | B62D 15/027 |
| EP | 4488147 | A1 | * | 1/2025 | B62D 15/029 |
| EP | 4541675 | A1 | * | 4/2025 | B60D 1/245 |
| JP | 2004058829 | A | * | 2/2004 | |
| JP | 2021-111814 | A | | 8/2021 | |
| JP | 2023125270 | A | * | 9/2023 | B62D 15/029 |
| JP | 2023184174 | A | * | 12/2023 | B60D 1/245 |
| JP | 7750773 | B2 | * | 10/2025 | B62D 15/029 |
| WO | WO-2023162677 | A1 | * | 8/2023 | B62D 13/06 |
| WO | WO-2023243368 | A1 | * | 12/2023 | B60D 1/245 |

OTHER PUBLICATIONS

Mar. 14, 2023 Search Report issued in International Patent Application No. PCT/JP2023/004005.

* cited by examiner

CONTROL DEVICE FOR ARTICULATED VEHICLE

CROSS-REFERENCE TO RELATED APPLICATIONS

This application is national stage application of International Application No. PCT/JP2023/004005, filed on Feb. 7, 2023, which claims the benefit of priority from Japanese Patent Application No. 2022-029269, filed on Feb. 28, 2022, the entire contents of each of which are incorporated herein by reference.

TECHNICAL FIELD

The present disclosure relates to a control device for a combination vehicle.

BACKGROUND ART

Conventionally, there is a combination vehicle in which a trailer is combined with a vehicle serving as a tractor. Steering of the combination vehicle is more difficult than steering of a single vehicle such as an ordinary-sized passenger car. In particular, when the combination vehicle is moved in reverse, the required steering operation is opposite to the steering operation to be performed when a single vehicle without a trailer connected thereto is moved in reverse. When the combination vehicle is moved in reverse, it is necessary to apply brakes, for example, to stabilize the combination of the vehicle and the trailer before a so-called jackknife phenomenon occurs. The jackknife phenomenon refers to a phenomenon in which the connection portion between the vehicle and the trailer bends significantly when the combination vehicle is moved in reverse.

For example, a reverse assist system of Patent Document 1 limits a hitch angle. The hitch angle is an angle between a central axis extending in a longitudinal direction of the vehicle and a central axis extending in a longitudinal direction of the trailer. The reverse assist system calculates a first hitch limit angle based on a desired trailer curvature selected through an operation on a knob. A user of the vehicle can set a second limit angle within the first hitch limit angle. The user of the vehicle can select either the first limit angle or the second limit angle. The reverse assist system causes a display device to display the first limit angle or the second limit angle selected by the user of the vehicle.

RELATED ART DOCUMENTS

Patent Documents

Patent Document 1: US Patent Application Publication No. 2020/0164919

SUMMARY OF THE INVENTION

Problem to be Solved by the Invention

In the reverse assist system that limits the hitch angle as in Patent Document 1, the following concerns arise. That is, a response delay occurs in the hitch angle due to physical constraints on the combination vehicle, etc. For example, when the trailer curvature set through the operation on the knob changes suddenly, there is a possibility that the hitch angle cannot respond appropriately to the sudden change in the trailer curvature. This may cause the jackknife phenomenon. There is a demand that the control device for the combination vehicle more appropriately suppress the occurrence of the jackknife phenomenon and therefore achieve more appropriate vehicle behavior.

Means for Solving the Problem

A control device for a combination vehicle according to one aspect of the present disclosure is configured to control a combination vehicle including a tractor including a steered wheel that is a wheel configured to change a direction of travel of the vehicle, and a trailer towed by the tractor. The control device for the combination vehicle includes a control unit configured to, when a reverse operation of the combination vehicle is performed, assist a reverse operation of the trailer by causing a controlled variable to follow a target value of reverse control that is set through a specific operation by an operator. The control unit is configured to execute a process of limiting the target value and a process of limiting a time rate of change in the target value from a viewpoint of achieving appropriate vehicle behavior.

MODES FOR CARRYING OUT THE INVENTION

First Embodiment

A control device for a combination vehicle according to a first embodiment will be described.

Figure 1:
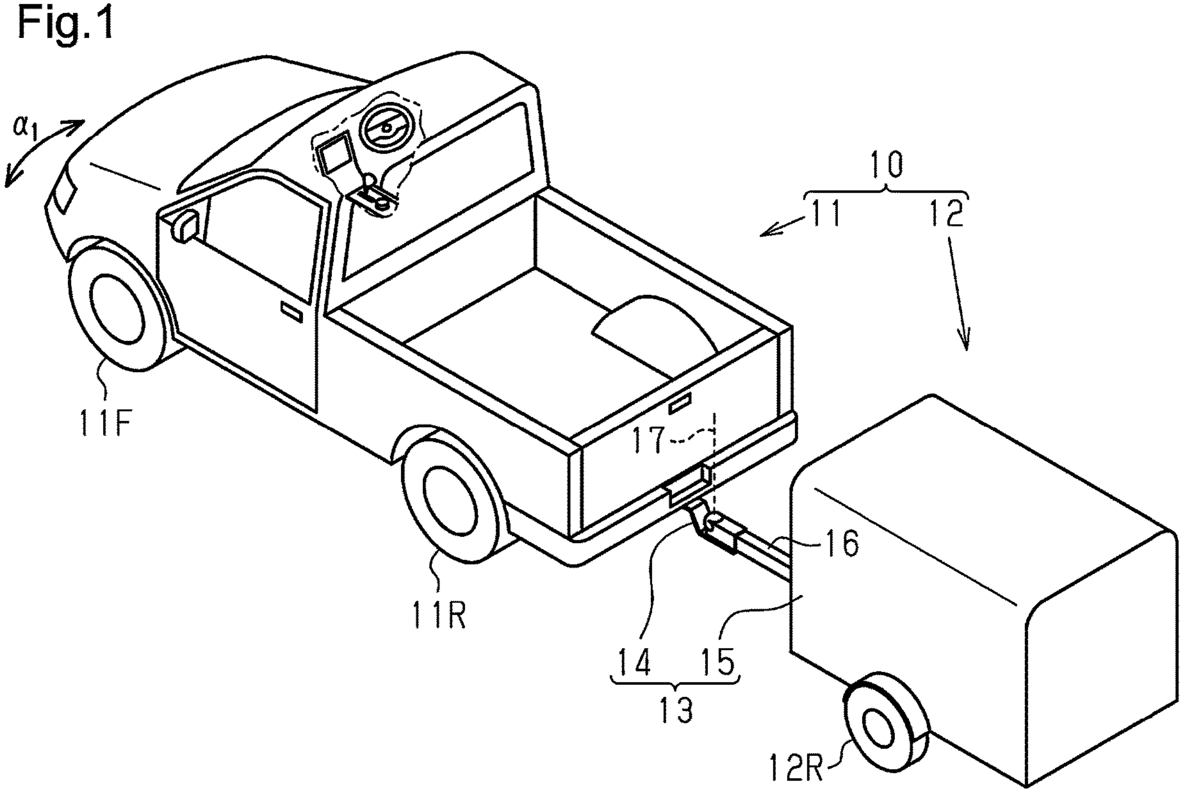
FIG. 1 is a perspective view of a combination vehicle including a first embodiment of a control device for the combination vehicle.

As shown in FIG. 1, a combination vehicle 10 includes a tractor 11 and a trailer 12. Although there are various types of tractor 11, a pickup truck that is one type of small freight vehicle is herein taken as an example. The tractor 11 includes front wheels 11F and rear wheels 11R. The front wheels 11F include two wheels, namely a right front wheel and a left front wheel, and the rear wheels 11R include two wheels, namely a right rear wheel and a left rear wheel. FIG. 1 shows only the left front wheel and the left rear wheel. The front wheels 11F and a steering wheel are connected to each other via a steering mechanism that is not shown so that power can be transmitted therebetween. The front wheels 11F are steered wheels. The steered wheels refer to wheels that change the direction of travel of the tractor 11 by moving in response to an operation on the steering wheel.

Although the trailer 12 has various shapes and sizes depending on applications, a box-shaped trailer is herein taken as an example. The trailer 12 includes wheels 12R. The wheels 12R include two wheels, namely a right wheel and a left wheel. FIG. 1 shows only the left wheel.

The trailer 12 is connected to the rear of the tractor 11 via a ball joint 13. The ball joint 13 includes a hitch ball 14 and a hitch coupler 15. The hitch ball 14 is provided at the rear of the tractor 11 via a hitch member. The hitch coupler 15 is provided at the tip of a tongue 16 that protrudes from the front of the trailer 12. When the hitch coupler 15 is attached to the hitch ball 14, the trailer 12 is connected to the tractor 11 so as to be rotatable about an axis 17. The axis 17 extends in a height direction of the tractor 11.

Figure 2:
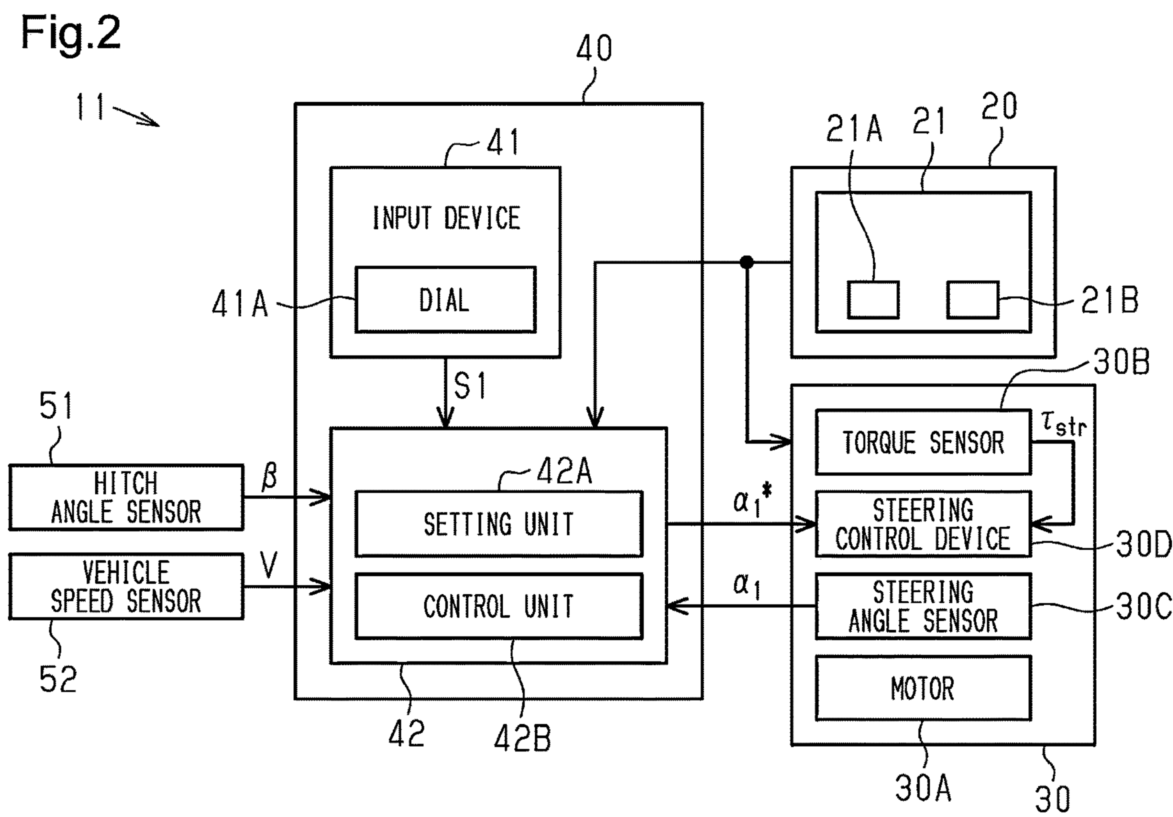
FIG. 2 is a block diagram of the first embodiment of the control device for the combination vehicle.

As shown in FIG. 2, the tractor 11 includes a display device 20, a power steering device 30, and a reverse assist device 40.

The display device 20 is provided, for example, on an instrument panel in a vehicle cabin. The display device 20 is, for example, a touch panel. It is possible to input data or give instructions for operations of in-vehicle devices by touching display on a screen 21. The screen 21 displays, for example, an assist start button 21A and an assist end button 21B. The assist start button 21A is operated when turning on a reverse assist function of the combination vehicle 10. The assist end button 21B is operated when turning off the reverse assist function of the combination vehicle 10.

The power steering device 30 is a system for assisting an operator in steering the steering wheel, and includes a motor 30A, a torque sensor 30B, a steering angle sensor 30C, and a steering control device 30D. The operator includes a driver who drives the combination vehicle 10 in the vehicle cabin of the tractor 11.

The motor 30A generates an assist force. The assist force is a force for assisting steering by the steering wheel. The torque of the motor 30A is applied to the steering mechanism of the front wheels 11F via a speed reduction mechanism. The torque sensor 30B detects a steering torque $\tau_{str}$ that is a torque applied to the steering wheel. The steering angle sensor 30C detects a steering angle $\alpha_1$ that is a turning angle of the front wheels 11F based on, for example, a rotation angle of the motor 30A. The front wheels 11F and the motor 30A operate in conjunction with each other via the steering mechanism. Therefore, there is a correlation between the rotation angle of the motor 30A and the steering angle $\alpha_1$ of the front wheels 11F. Thus, the steering angle $\alpha_1$ of the front wheel 11F can be determined based on the rotation angle of the motor 30A.

The steering control device 30D executes assist control when the reverse assist function of the combination vehicle 10 is off. That is, the steering control device 30D controls energization of the motor 30A based on the steering torque $\tau_{str}$ detected by the torque sensor 30B to cause the motor 30A to generate an assist force according to the steering torque $\tau_{str}$.

The steering control device 30D executes steering control on the front wheels 11F when the reverse assist function of the combination vehicle 10 is on. That is, when the reverse assist function of the combination vehicle 10 is on, the steering control device 30D controls the steering angle $\alpha_1$ of the front wheels 11F by controlling the rotation angle of the motor 30A based on a target steering angle $\alpha_1$* generated by the reverse assist device 40. The target steering angle $\alpha_1$* is a target value of the steering angle $\alpha_1$ of the front wheel 11F. The steering control device 30D controls the operation of the motor 30A by executing feedback control on the steering angle $\alpha_1$ of the front wheels 11F detected by the steering angle sensor 30C so that the steering angle $\alpha_1$ agrees with the target steering angle $\alpha_1$*.

The reverse assist device 40 assists the reverse operation of the combination vehicle 10 when the reverse assist function of the combination vehicle 10 is on. The reverse assist device 40 calculates the target steering angle $\alpha_1$* of the front wheels 11F based on a reverse direction or a reverse route of the combination vehicle 10 specified by the operator and the steering angle $\alpha_1$ of the front wheels 11F detected by the steering angle sensor 30C. The target steering angle $\alpha_1$* is a target value of the steering angle $\alpha_1$ of the front wheels 11F required for the combination vehicle 10 to move in the reverse direction or along the reverse route of the combination vehicle 10 specified by the operator. When the reverse assist function of the combination vehicle 10 is off, the reverse assist device 40 does not calculate the target steering angle $\alpha_1$*.

<Reverse Assist Device>

Next, the reverse assist device 40 will be described in detail.

As shown in FIG. 2, the reverse assist device 40 includes an input device 41 and a control device 42.

The input device 41 includes a dial 41A as an operation member. The dial 41A is provided, for example, on a center console in the vehicle cabin. The dial 41A is operated by the operator when specifying the reverse direction or the reverse route of the combination vehicle 10. The reverse direction or the reverse route includes, for example, a reverse left turn, a reverse right turn, and a straight reverse movement. When the combination vehicle 10 is turned to the left in reverse, the dial 41A is operated counterclockwise with respect to a reference position corresponding to a straight route. When the combination vehicle 10 is turned to the right in reverse, the dial 41A is operated clockwise with respect to the reference position. When the combination vehicle 10 is moved straight in reverse, the dial 41A is maintained at the reference position. The input device 41 generates an electric signal S1 according to the operation amount or the operation position of the dial 41A with respect to the reference position.

The control device 42 includes a processing circuit including any one of the following three components A1, A2, A3.

A1. One or more processors that operate according to a computer program that is software. The processor includes a CPU (central processing unit) and a memory.

A2. One or more dedicated hardware circuits, such as an application specific integrated circuit (ASIC), that perform at least part of various processes. The ASIC includes a CPU and a memory.

A3. A hardware circuit obtained by combining the components A1, A2. The memory is a medium that can be read by a computer (in this case, the CPU) and stores programs that describe processes or instructions for the computer. The memory includes a RAM (random access memory) and a ROM (read only memory). The CPU executes various types of control by executing the programs stored in the memory at a predetermined calculation cycle. The programs include a program for executing reverse assist control for the combination vehicle 10. The reverse assist control refers to control for assisting the reverse operation of the combination vehicle 10.

The control device 42 executes the reverse assist control for the combination vehicle 10. The control device 42 starts executing the reverse assist control when the operator performs an operation to start the reverse assist control. The control device 42 stops executing the reverse assist control when the operator performs an operation to end the reverse assist control. The operator performs the operations to start and end the reverse assist control via the display device 20. When the assist start button 21A displayed on the screen 21 of the display device 20 is touched, the control device 42 starts executing the reverse assist control. When the assist end button 21B displayed on the screen 21 of the display device 20 is touched, the control device 42 ends the execution of the reverse assist control.

During the execution of the reverse assist control, the control device 42 controls the reverse route of the combination vehicle 10 via the power steering device 30 so that the combination vehicle 10 moves in the reverse direction or along the reverse route of the combination vehicle 10 specified by the operator.

The control device 42 includes a setting unit 42A and a control unit 42B. The setting unit 42A sets a target virtual steering angle $\alpha_2$* of the trailer 12 based on the electric signal S1 generated by the input device 41, that is, the operation amount or the operation position of the dial 41A with respect to the reference position. The target virtual steering angle $\alpha$2* is a target value of a virtual steering angle $\alpha$2 of the trailer 12. The virtual steering angle $\alpha_2$ refers to an apparent steering angle when the trailer 12 is virtually separated from the tractor 11 and regarded as a single vehicle including virtual front wheels. The setting unit 42A calculates the target virtual steering angle $\alpha_2$* corresponding to the operation amount or the operation position of the dial 41A, for example, using a map that defines the relationship between the operation amount or the operation position of the dial 41A and the target virtual steering angle $\alpha_2$* of the trailer 12. The operator can specify the target virtual steering angle $\alpha_2$* according to a desired reverse route for reversing the trailer 12 by operating the dial 41A.

The control unit 42B acquires the target virtual steering angle $\alpha_2$* set by the setting unit 42A, a hitch angle $\beta$ detected by an in-vehicle hitch angle sensor 51, a vehicle speed V detected by an in-vehicle vehicle speed sensor 52, and the steering angle $\alpha_1$ detected by the steering angle sensor 30C. The hitch angle $\beta$ refers to an angle between a central axis extending in a longitudinal direction of the tractor 11 and a central axis extending in a longitudinal direction of the trailer 12. The hitch angle $\beta$ is also referred to as a bending angle of the trailer 12.

The control unit 42B calculates the target steering angle $\alpha_1$* of the front wheels 11F of the tractor 11 based on the target virtual steering angle $\alpha_2$* set by the setting unit 42A and the hitch angle $\beta$, the vehicle speed V, and the steering angle $\alpha_1$ detected by the sensors. The control unit 42B calculates the target steering angle $\alpha_1$* of the front wheels 11F so that the virtual steering angle $\alpha_2$ of the trailer 12 converges to the target virtual steering angle $\alpha_2$*. That is, the control unit 42B calculates the target steering angle $\alpha_1$* of the front wheels 11F by executing feedback control on the virtual steering angle $\alpha_2$ of the trailer 12 so that the virtual steering angle $\alpha_2$ agrees with the target virtual steering angle $\alpha_2$*. The control unit 42B may calculate the target steering angle $\alpha_1$* using, for example, nonlinear model predictive control (NMPC).

<Kinematic Model of Combination Vehicle>

Next, a kinematic model indicating the behavior of the combination vehicle 10 moving in a plane will be described.

Figure 3:
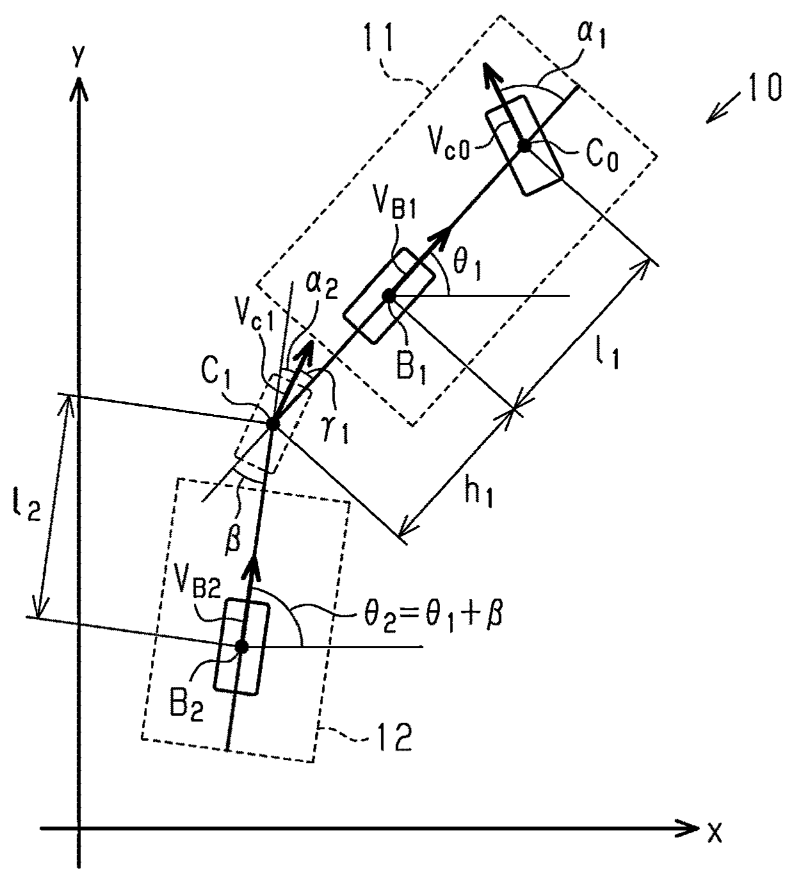
FIG. 3 is a kinematic model of the combination vehicle according to the first embodiment.

As shown in FIG. 3, the kinematic model of the combination vehicle 10 can be considered as an equivalent model in which the right and left wheels are shifted to the central axis of the vehicle body in a two-dimensional xy coordinate system fixed to the ground. The kinematic model in FIG. 3 is a kinematic model when the combination vehicle 10 moves forward. In the kinematic model of FIG. 3, in order to clarify the behavior of the combination vehicle 10 within the range of kinematics, it is assumed that no skid occurs in tires of the combination vehicle 10 at extremely low speeds and the combination vehicle 10 has a velocity vector only in the direction of travel. It is also assumed that the vehicle is driven at a constant speed. It is also assumed that the road surface is flat and there is no disturbance from the outside of the combination vehicle 10.

In the kinematic model of FIG. 3, parameters of the combination vehicle 10 used to describe the kinematic relationship between the tractor 11 and the trailer 12 are as follows.

$C_0$: Front wheel 11F of tractor 11

$B_1$: Rear wheel 11R of tractor 11

$C_1$: Hitch point of tractor 11 (point indicating position of hitch ball 14)

$B_2$: Wheel of trailer 12

$V_{c0}$: Velocity vector of front wheel 11F of tractor 11

$V_{B1}$: Velocity vector of rear wheel 11R of tractor 11

$V_{c1}$: Velocity vector of hitch point $C_1$ of tractor 11

$V_{B2}$: Velocity vector of trailer 12

$\alpha_1$: Steering angle of front wheel 11F of tractor 11

$\alpha_2$: Virtual steering angle of trailer 12

$\gamma_1$: Intermediate variable (angle between central axis of tractor 11 and velocity vector $V_{c1}$ of hitch point $C_1$)

$\theta_1$: Attitude angle of tractor 11 (angle between central axis of tractor 11 and X-axis)

$\theta_2$: Attitude angle of trailer 12 (angle between central axis of trailer 12 and X-axis)

$\beta$: Hitch angle (angle between central axis of tractor 11 and central axis of trailer 12)

$l_1$: Wheelbase of tractor 11

$h_1$: Distance between rear wheel 11R of tractor 11 and hitch point $C_1$ $l_2$: Virtual wheelbase of trailer 12

The signs of each parameter are as follows. That is, the tractor attitude angle $\theta_1$ is positive in the counterclockwise direction with respect to the X-axis. The steering angle $\alpha_1$ of the front wheel 11F of the tractor 11 and the intermediate variable $\gamma_1$ are positive in the counterclockwise direction with respect to the central axis of the tractor 11. The hitch angle β is positive in the counterclockwise direction with respect to the central axis of the tractor 11 or its extension line. The vehicle speed V is positive for the forward movement and negative for the reverse movement.

Figure 4:
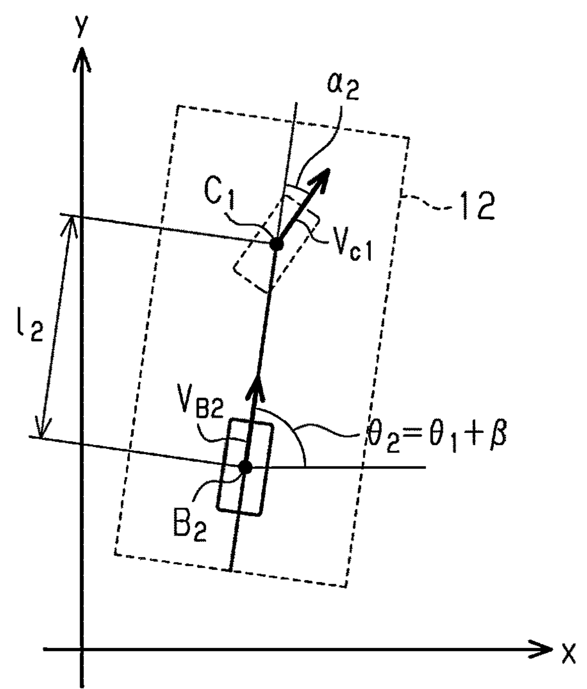
FIG. 4 is a kinematic model of a trailer according to the first embodiment.

As shown in FIG. 3, the tractor 11 moves according to the velocity vector $V_{c0}$ of the front wheel 11F. The trailer 12 moves according to the velocity vector $V_{c1}$ of the hitch point $C_1$ that is the point of connection to the tractor 11. From this, the velocity vector $V_{c1}$ of the hitch point $C_1$ as seen from the trailer 12 can be regarded as a velocity vector of the virtual front wheel of the trailer 12. In the kinematic model of FIG. 3, the angle between the velocity vector $V_{c1}$ of the hitch point $C_1$ and the central axis of the trailer 12 is "$\beta-\gamma_1$". In this case, when the trailer 12 is virtually separated from the tractor 11 and regarded as a single vehicle including the virtual front wheel as shown in FIG. 4, the virtual front wheel can be regarded as being steered at the virtual steering angle $\alpha_2$ ($=-(\beta-\gamma_1)$) that is an apparent steering angle. From this, it is understood that the trailer 12 can be considered as a single vehicle. In the kinematic model for the reverse movement of the combination vehicle 10, the velocity vectors are in the opposite directions to those in the kinematic model for the forward movement in FIG. 3.

The virtual steering angle $\alpha_2$ of the trailer 12 is represented by the following expression 1. The expression 1 is an equation of motion for the virtual steering angle $\alpha_2$.

$$\alpha_2 = -\beta - a\tan\left(\frac{h_1}{l_1}\tan\alpha_1\right) \quad \text{[Math. 1]}$$

where "β" is the hitch angle, "$l_1$" is the wheelbase of the tractor 11, "$h_1$" is the distance between the rear wheel 11R of the tractor 11 and the hitch point $C_1$, "$\alpha_1$" is the steering angle of the front wheel 11F of the tractor 11, and "a tan" is an abbreviation of "arctan" and represents an arctangent function.

<Jackknife Suppression Process>

The control device 42 has a function of suppressing the occurrence of a jackknife phenomenon. The jackknife phenomenon refers to a phenomenon in which the connection portion between the tractor 11 and the trailer 12 bends significantly when the combination vehicle 10 is moved in reverse.

The control unit 42B starts executing a jackknife suppression process, for example, when the operator performs an operation to start the reverse assist control, that is, when the assist start button 21A displayed on the screen 21 of the display device 20 is touched. The jackknife suppression process is a process for suppressing the occurrence of the jackknife phenomenon. The control unit 42B may start executing the jackknife suppression process when the shift range of a transmission mounted on the tractor 11 is switched to a reverse position. The control unit 42B executes the jackknife suppression process according to a program stored in the storage device of the control unit 42B that is not shown.

Figure 5:
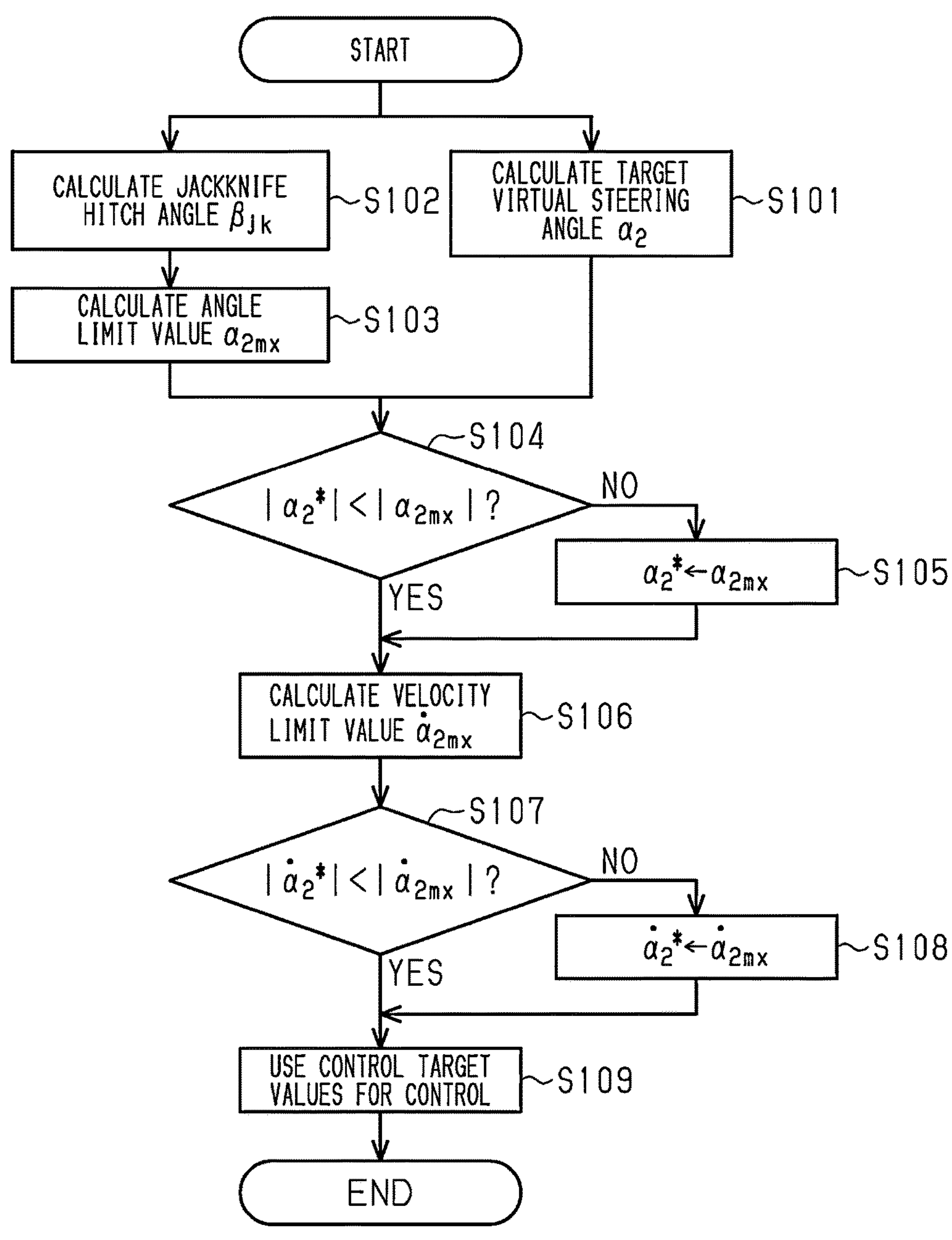
FIG. 5 is a flowchart showing the procedure of a process of limiting control target values according to the first embodiment.

As shown in a flowchart of FIG. 5, the control unit 42B first calculates the target virtual steering angle $\alpha_2^*$ (step S101). The target virtual steering angle $\alpha_2^*$ is a target value of the virtual steering angle $\alpha_2$ that is an internal controlled variable of the control unit 42B.

The control unit 42B calculates the target virtual steering angle $\alpha_2^*$, for example, based on the electric signal S1 generated by the input device 41, that is, the operation amount or the operation position of the dial 41A with respect to the reference position. The control unit 42B calculates the target virtual steering angle $\alpha_2^*$ corresponding to the operation amount or the operation position of the dial 41A, for example, using the map that defines the relationship between the operation amount or the operation position of the dial 41A and the target virtual steering angle $\alpha_2^*$.

The control unit 42B calculates a jackknife hitch angle $\beta_{jk}$ (step S102). The jackknife hitch angle $\beta_{jk}$ is a boundary value of the hitch angle β as to whether the jackknife phenomenon occurs. The jackknife hitch angle $\beta_{jk}$ is physically defined as a hitch angle β when the value of a hitch angle velocity β(·) that is a time rate of change in the hitch angle β is "0" at a maximum steering angle $\alpha_{1mx}$ of the front wheel 11F of the tractor 11. The symbol "•" represents a time derivative. The maximum steering angle $\alpha_{1mx}$ is the maximum value of the steering angle $\alpha_1$ of the front wheel 11F of the tractor 11 that can be taken physically.

The equation of motion for the hitch angle velocity β(·) is represented by the following expression 2.

$$\dot{\beta} = -\frac{V_{B1}}{l_2}\sin\beta - \frac{V_{B1}}{l_1 l_2}(l_2 + h_1\cos\beta)\tan\alpha_1 \quad \text{[Math. 2]}$$

where "$l_1$" is the wheelbase of the tractor 11, "$l_2$" is the virtual wheelbase of the trailer 12, "$V_{B1}$" is the velocity vector of the rear wheel 11R of the tractor 11, "$h_1$" is the distance between the rear wheel 11R of the tractor 11 and the hitch point $C_1$, and "$\alpha_1$" is the steering angle of the front wheel 11F of the tractor 11.

The control unit 42B substitutes the maximum steering angle $\alpha_{1mx}$ for the steering angle $\alpha_1$ and substitutes "0" for the hitch angle velocity β(·) in the expression 2. Then, the control unit 42B obtains the jackknife hitch angle $\beta_{jk}$ by solving the expression 2 for the hitch angle β.

The control unit 42B calculates an angle limit value $\alpha_{2mx}$ for the target virtual steering angle $\alpha_2^*$ based on the jackknife hitch angle $\beta_{jk}$ calculated in step S102 (step S103). The control unit 42B calculates the angle limit value $\alpha_{2mx}$ using the following expression 3. The expression 3 is obtained by substituting the jackknife hitch angle $\beta_{jk}$ for the hitch angle β and substituting the maximum steering angle $\alpha_{1mx}$ for the steering angle $\alpha_1$ in the above expression 1 that is the equation of motion for the virtual steering angle $\alpha_2$.

$$\alpha_{2mx} = -\beta_{jk} + \arctan\left(\frac{h}{l_1}\tan(\alpha_{1mx})\right) \quad \text{[Math. 3]}$$

where "$\beta_{jk}$" is the jackknife hitch angle, "$l_1$" is the wheelbase of the tractor 11, "$h_1$" is the distance between the rear wheel 11R of the tractor 11 and the hitch point $C_1$, and "$\alpha_{1mx}$" is the maximum steering angle of the front wheel 11F of the tractor 11.

Next, the control unit 42B determines whether the absolute value of the target virtual steering angle $\alpha_2^*$ is smaller than the absolute value of the angle limit value $\alpha_{2mx}$ (step S104).

When the absolute value of the target virtual steering angle $\alpha_2^*$ calculated in step S101 is not smaller than the absolute value of the angle limit value $\alpha_{2mx}$ (NO in step S104), the control unit 42B advances the process to step S105.

In step S105, the control unit 42B limits the target virtual steering angle $\alpha_2^*$ calculated in step S101 to the angle limit value $\alpha_{2mx}$. The control unit 42B holds the target virtual steering angle $\alpha_2^*$ limited to the angle limit value $\alpha_{2mx}$ as a final target virtual steering angle $\alpha_2^*$ to be used for controlling the behavior of the combination vehicle 10.

When the absolute value of the target virtual steering angle $\alpha_2^*$ calculated in step S101 is smaller than the absolute value of the angle limit value $\alpha_{2mx}$ (YES in step S104), the target virtual steering angle $\alpha_2^*$ calculated in step S101 is held as the final target virtual steering angle $\alpha_2^*$ to be used for controlling the behavior of the combination vehicle 10.

Next, the control unit 42B calculates a velocity limit value $\alpha_{2mx}(\cdot)$ for a target virtual steering angle velocity $\alpha_2^*(\cdot)$ (step S106). The target virtual steering angle velocity $\alpha_2^*(\cdot)$ is a time rate of change in the target virtual steering angle $\alpha_2^*$. The target virtual steering angle velocity $\alpha_2^*(\cdot)$ is obtained by differentiating the target virtual steering angle $\alpha_2^*$ in terms of time.

A virtual steering angle velocity $\alpha_2(\cdot)$ is represented by the following expression 4. The expression 4 is an equation of motion for the virtual steering angle velocity $\alpha_2(\cdot)$.

$$\dot{\alpha}_2 = -\dot{\beta} - \frac{h_1}{l_1\cos^2(\alpha_1) + \frac{h_1^2}{l_1}\sin^2(\alpha_1)}\dot{\alpha}_1 \quad \text{[Math. 4]}$$

where "$\beta(\cdot)$" is the hitch angle velocity. The hitch angle velocity $\beta(\cdot)$ can be calculated using the above expression 2. The symbol "α1" is the steering angle of the front wheel 11F of the tractor 11, "$l_1$" is the wheelbase of the tractor 11, "$h_1$" is the distance between the rear wheel 11R of the tractor 11 and the hitch point $C_1$, and "$\alpha_1(\cdot)$" is the steering angle velocity of the front wheel 11F of the tractor 11.

The velocity limit value $\alpha_{2mx}(\cdot)$ for the target virtual steering angle velocity $\alpha_2^*(\cdot)$ is obtained by substituting a maximum steering speed $\alpha_{1mx}(\cdot)$ of the front wheel 11F for the steering angle velocity $\alpha_1(\cdot)$ in the second term on the right side of the expression 4.

When the value of the steering angle $\alpha_1$ does not change, the second term on the right side of the expression 4 may be calculated as "0". The situation in which the value of the steering angle $\alpha_1$ does not change includes, for example, a case where the front wheel 11F is kept at a limit position of its physical movable range, or a case where the value of the steering angle $\alpha_1$ that corresponds to a straightforward state of the combination vehicle 10 is "0".

Next, the control unit 42B determines whether the absolute value of the target virtual steering angle velocity $\alpha_2^*(\cdot)$ is smaller than the absolute value of the velocity limit value $\alpha_{2mx}(\cdot)$ (step S107).

When the absolute value of the target virtual steering angle velocity $\alpha_2^*(\cdot)$ is not smaller than the absolute value of the velocity limit value $\alpha_{2mx}(\cdot)$ (NO in step S107), the control unit 42B advances the process to step S108.

In step S108, the control unit 42B limits the target virtual steering angle velocity $\alpha_2^*(\cdot)$ that is based on the target virtual steering angle $\alpha_2^*$ calculated in step S101 to the velocity limit value $\alpha_{2mx}(\cdot)$. The control unit 42B holds the target virtual steering angle velocity $\alpha_2^*(\cdot)$ limited to the velocity limit value $\alpha_{2mx}(\cdot)$ as a final target virtual steering angle velocity $\alpha_2^*(\cdot)$ to be used for controlling the behavior of the combination vehicle 10.

When the absolute value of the target virtual steering angle velocity $\alpha_2^*(\cdot)$ is smaller than the absolute value of the velocity limit value $\alpha_{2mx}(\cdot)$ (YES in step S107), the control unit 42B holds the target virtual steering angle velocity $\alpha_2^*(\cdot)$ that is based on the target virtual steering angle $\alpha_2^*$ calculated in step S101 as the final target virtual steering angle velocity $\alpha_2^*(\cdot)$ to be used for controlling the behavior of the combination vehicle 10.

The control unit 42B controls the behavior of the combination vehicle 10 using the final target virtual steering angle $\alpha_2^*$ and the final target virtual steering angle velocity $\alpha_2^*(\cdot)$ that are control target values (step S109).

<Behavior of Control Target Value>

Next, an example of the behavior of the target virtual steering angle $\alpha_2^*$ that is the control target value will be described.

First, a comparative example in which the target virtual steering angle $\alpha_2^*$ and the target virtual steering angle velocity $\alpha_2^*(\cdot)$ are not limited will be discussed. In the comparative example, when a target virtual steering angle $\alpha_2^*$ exceeding the absolute value of the angle limit value $\alpha_{2mx}$ is set through the operation on the dial 41A, the target virtual steering angle $\alpha_2^*$ changes, for example, as follows.

Figure 6:
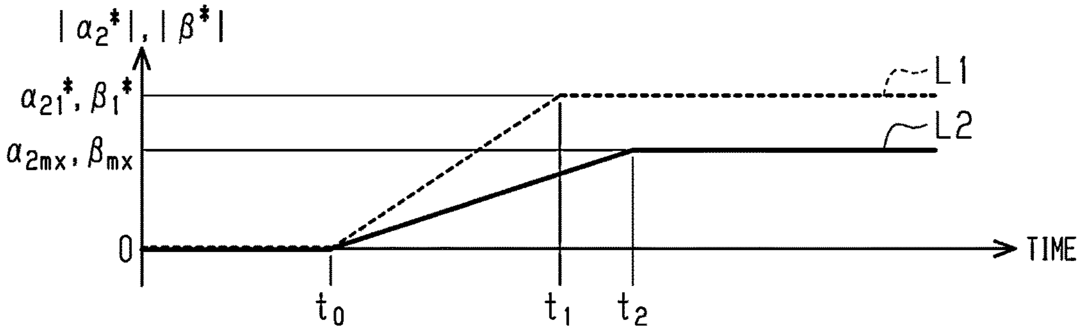
FIG. 6 is a graph showing an example of behavior of the control target value according to the first embodiment.

As indicated by a characteristic line L1 in a graph of FIG. 6, when the reverse assist control is started (time $t_0$), the absolute value of the target virtual steering angle $\alpha_2^*$ gradually increases from an initial value "0" toward a current set value $\alpha_{21}^*$. The set value $\alpha_{21}^*$ is a value exceeding the absolute value of the angle limit value $\alpha_{2mx}$. The absolute value of the target virtual steering angle $\alpha_2^*$ increases, for example, at a target virtual steering angle velocity $\alpha_2^*(\cdot)$ exceeding the velocity limit value $\alpha_{2mx}(\cdot)$. The target virtual steering angle velocity $\alpha_2^*(\cdot)$ is the amount of change per unit time in the absolute value of the target virtual steering angle $\alpha_2^*$, and indicates the slope of the characteristic line L1. The absolute value of the target virtual steering angle $\alpha_2^*$ exceeds the absolute value of the angle limit value $\alpha_{2mx}$, and eventually reaches the current set value $\alpha_{21}^*$ (time $t_1$).

Next, the present embodiment in which the target virtual steering angle $\alpha_2^*$ and the target virtual steering angle velocity $\alpha_2^*(\cdot)$ are limited will be discussed. In the present embodiment, when a target virtual steering angle $\alpha_2^*$ exceeding the absolute value of the angle limit value $\alpha_{2mx}$ is set through the operation on the dial 41A, the target virtual steering angle $\alpha_2^*$ changes as follows.

As indicated by a characteristic line L2 in the graph of FIG. 6, when the reverse assist control is started (time $t_0$), the absolute value of the target virtual steering angle $\alpha_2^*$ gradually increases from the initial value "0" toward the current set value $\alpha_{21}^*$. The absolute value of the target virtual steering angle $\alpha_2^*$ increases at the target virtual steering angle velocity $\alpha_2^*(\cdot)$ limited to the velocity limit value $\alpha_{2mx}(\cdot)$. That is, the slope of the characteristic line L2 is smaller than the slope of the characteristic line L1. The absolute value of the target virtual steering angle $\alpha_2^*$ eventually reaches the absolute value of the angle limit value $\alpha_{2mx}$ (time $t_2$). Although the current set value $\alpha_{21}^*$ exceeds the absolute value of the angle limit value $\alpha_{2mx}$, the absolute value of the target virtual steering angle $\alpha_2^*$ is kept limited to the absolute value of the angle limit value $\alpha_{2mx}$.

Functions of First Embodiment

Next, functions of the first embodiment will be described. For example, the combination vehicle 10 turns to the right in reverse and then turns to the left in reverse. The turning radius of the reverse right turn is the same as the turning radius of the reverse left turn. When turning, a target steering angle $\alpha_1^*$ exceeding the maximum steering angle $\alpha_{1mx}$ that is the limit value of the physical movable range of the front wheel 11F of the tractor 11 is set through the operation on the dial 41A.

Figure 7:
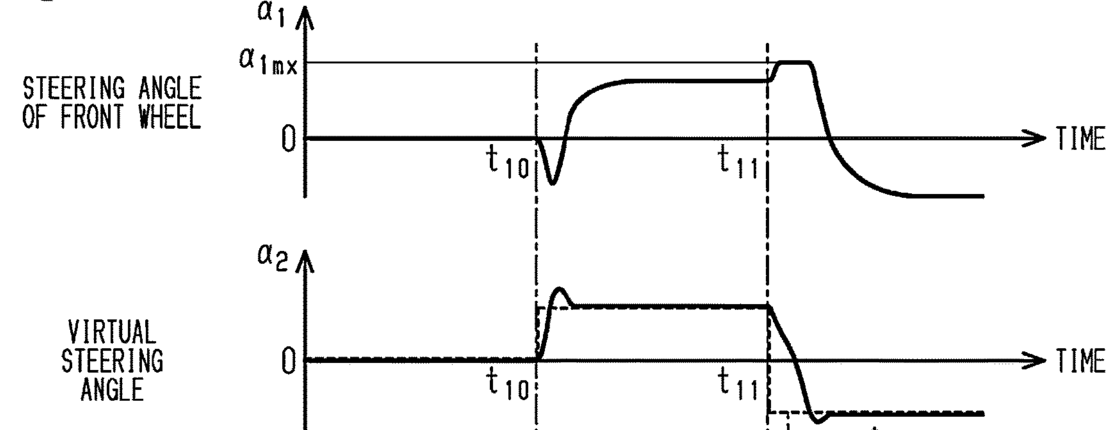
FIG. 7 is a diagram illustrating functions of the first embodiment, including graphs showing changes over time in steering angle of front wheels of a tractor in a comparative example and changes over time in virtual steering angle in the comparative example.

As shown in FIG. 7, along with the start of the reverse right turn of the combination vehicle 10 (time $t_{10}$), the steering angle $\alpha_1$ of the front wheel 11F of the tractor 11 changes in a negative direction and then gradually increases in a positive direction. The steering angle $\alpha_1$ eventually reaches a constant positive value. After the steering angle $\alpha_1$ reaches the constant positive value, the steering angle $\alpha_1$ is kept at the constant positive value for a predetermined period. The absolute value of the constant positive value is a value smaller than the absolute value of the maximum steering angle $\alpha_{1mx}$.

After the combination vehicle 10 finishes the reverse right turn, the combination vehicle 10 then starts the reverse left turn (time $t_{11}$). The steering angle $\alpha_1$ starts to increase again in the positive direction from the constant positive value smaller than the absolute value of the maximum steering angle $\alpha_{1mx}$. This is caused by, for example, a response delay in the steering angle $\alpha_1$ due to physical constraints on the combination vehicle 10. After the steering angle $\alpha_1$ reaches the maximum steering angle $\alpha_{1mx}$, the steering angle $\alpha_1$ then decreases in the negative direction and is kept at a constant negative value.

In the comparative example in which the target virtual steering angle velocity $\alpha_2*(\cdot)$ is not limited, the virtual steering angle $\alpha_2$ changes as follows.

As shown in FIG. 7, in the comparative example, when the combination vehicle 10 starts the reverse right turn (time $t_{10}$), the virtual steering angle $\alpha_2$ gradually increases in the positive direction along with the increase in the steering angle $\alpha_1$ in the positive direction. After the virtual steering angle $\alpha_2$ exceeds the positive target virtual steering angle $\alpha_2*$ in the positive direction, the virtual steering angle $\alpha_2$ then decreases in the negative direction and eventually reaches the positive target virtual steering angle $\alpha_2*$. After the virtual steering angle $\alpha_2$ reaches the positive target virtual steering angle $\alpha_2*$, the virtual steering angle $\alpha_2$ is kept at the positive target virtual steering angle $\alpha_2*$ until the combination vehicle 10 finishes the reverse right turn.

After the combination vehicle 10 finishes the reverse right turn, the combination vehicle 10 then starts the reverse left turn (time $t_{11}$). The virtual steering angle $\alpha_2$ gradually decreases in the negative direction from the positive target virtual steering angle $\alpha_2*$. After the virtual steering angle $\alpha_2$ exceeds the negative target virtual steering angle $\alpha_2*$ in the negative direction, the virtual steering angle $\alpha_2$ then reverses in the positive direction and eventually reaches the negative target virtual steering angle $\alpha_2*$. After the virtual steering angle $\alpha_2$ reaches the negative target virtual steering angle $\alpha_2*$, the virtual steering angle $\alpha_2$ is kept at the negative target virtual steering angle $\alpha_2*$.

As shown in FIG. 7, an overshoot of the virtual steering angle $\alpha_2$ occurs in the comparative example. The overshoot is a phenomenon in which the virtual steering angle $\alpha_2$ that is the controlled variable exceeds the target virtual steering angle $\alpha_2*$ that is the target value. Due to the physical constraints on the combination vehicle 10, there is a response delay in the steering angle $\alpha_1$ and the hitch angle $\beta$. Therefore, when the target steering angle $\alpha_1*$ changes suddenly, there is a possibility that the steering angle $\alpha_1$ cannot follow the change in the target steering angle $\alpha_1*$. When a target hitch angle $\beta*$ changes suddenly, there is a possibility that the hitch angle $\beta$ cannot follow the change in the target hitch angle $\beta*$.

In the first embodiment in which the target virtual steering angle velocity $\alpha_2*(\cdot)$ is limited, the steering angle $\alpha_1$ and the virtual steering angle $\alpha_2$ change as follows. The preconditions such as the turning direction of the combination vehicle 10 and the amount of operation on the dial 41A are the same as those in the comparative example. That is, the combination vehicle 10 turns to the right in reverse and then turns to the left in reverse. The turning radius of the reverse right turn is the same as the turning radius of the reverse left turn. When turning, a target steering angle $\alpha_1*$ exceeding the maximum steering angle $\alpha_{1mx}$ that is the limit value of the physical movable range of the front wheel 11F of the tractor 11 is set through the operation on the dial 41A.

Figure 8:
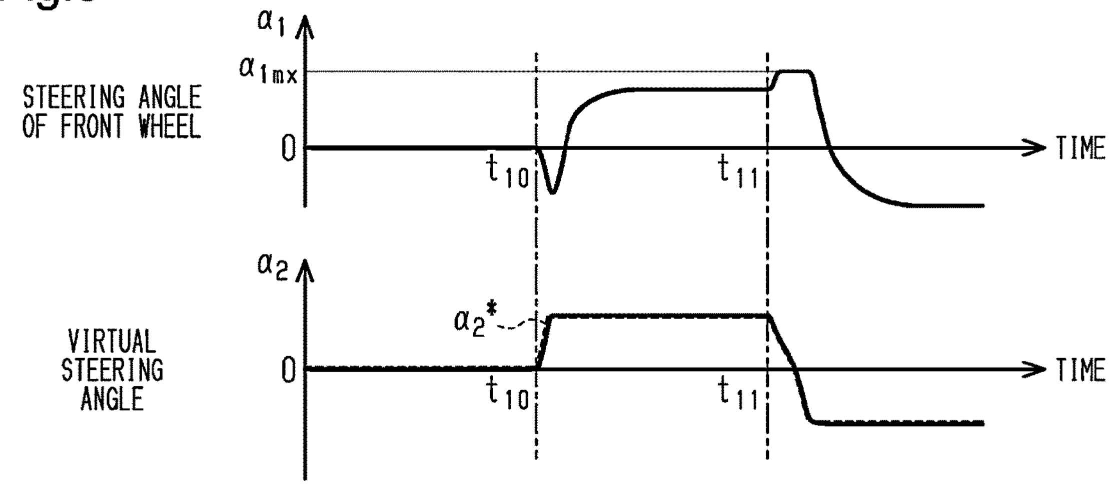
FIG. 8 is a diagram illustrating the functions of the first embodiment, including graphs showing changes over time in steering angle of front wheels of a tractor in the first embodiment and changes over time in virtual steering angle in the first embodiment.

As shown in FIG. 8, the steering angle $\alpha_1$ changes in the same manner as in the comparative example shown in FIG. 7. As shown in FIG. 8, along with the increase in the steering angle $\alpha_1$ in the positive direction, the virtual steering angle $\alpha_2$ gradually increases in the positive direction and eventually reaches the positive target virtual steering angle $\alpha_2*$. Unlike the comparative example shown in FIG. 7, the virtual steering angle $\alpha_2$ does not exceed the positive target virtual steering angle $\alpha_2*$ in the positive direction. After the virtual steering angle $\alpha_2$ reaches the positive target virtual steering angle $\alpha_2*$, the virtual steering angle $\alpha_2$ is kept at the positive target virtual steering angle $\alpha_2*$ until the combination vehicle 10 finishes the reverse right turn.

After the combination vehicle 10 finishes the reverse right turn, the combination vehicle 10 then starts the reverse left turn (time $t_{11}$). The virtual steering angle $\alpha_2$ gradually decreases in the negative direction from the positive target virtual steering angle $\alpha_2*$, and eventually reaches the negative target virtual steering angle $\alpha_2*$. Unlike the comparative example shown in FIG. 7, the virtual steering angle $\alpha_2$ does not exceed the negative target virtual steering angle $\alpha_2*$ in the negative direction. After the virtual steering angle $\alpha_2$ reaches the negative target virtual steering angle $\alpha_2*$, the virtual steering angle $\alpha_2$ is kept at the negative target virtual steering angle $\alpha_2*$.

Effects of First Embodiment

The first embodiment has the following effects.

(1-1) The control device 42 limits the target value of the reverse control of the combination vehicle 10 from the viewpoint of achieving appropriate vehicle behavior. For example, the control device 42 executes the process of limiting the target virtual steering angle $\alpha_2*$ that is the target value of the reverse control of the combination vehicle 10. The control device 42 sets the angle limit value $\alpha_{2mx}$ for the target virtual steering angle $\alpha_2*$. By limiting the target virtual steering angle $\alpha_2*$ to the angle limit value $\alpha_{2mx}$, it is possible to suppress the calculation of the target virtual steering angle $\alpha_2*$ having an excessively large absolute value that exceeds the angle limit value $\alpha_{2mx}$. Therefore, more appropriate vehicle behavior can be achieved.

The control device 42 calculates the angle limit value $\alpha_{2mx}$ by substituting the value of the jackknife hitch angle $\beta_{jk}$ and the value of the maximum steering angle $\alpha_{1mx}$ into the equation of motion for the virtual steering angle $\alpha_2$. The angle limit value $\alpha_{2mx}$ is the limit value for the target virtual steering angle $\alpha_2*$. The equation of motion for the virtual steering angle $\alpha_2$ is the above expression 1. The angle limit value $\alpha_{2mx}$ is obtained by substituting the value of the jackknife hitch angle $\beta_{jk}$ for the hitch angle $\beta$ and the value of the maximum steering angle $\alpha_{1mx}$ for the steering angle $\alpha_1$ in the expression 1.

(1-2) The control device 42 limits the target value of the reverse control of the combination vehicle 10, for example, from the viewpoint of suppressing the occurrence of the jackknife phenomenon. For example, the absolute value of the steering angle $\alpha_1$ and therefore the absolute value of the hitch angle $\beta$ increase as the absolute value of the target virtual steering angle $\alpha_2$* increases. By limiting the absolute value of the target virtual steering angle $\alpha_2$*, it is possible to limit the absolute value of the steering angle $\alpha_1$ and therefore the absolute value of the hitch angle $\beta$. This suppresses the occurrence of the case where the absolute value of the hitch angle $\beta$ exceeds the absolute value of the jackknife hitch angle $\beta_{jk}$. Thus, the occurrence of the jackknife phenomenon can be suppressed during the execution of the reverse assist control for the combination vehicle 10. Therefore, more appropriate vehicle behavior can be achieved. The jackknife hitch angle $\beta_{jk}$ is the boundary value as to whether the jackknife phenomenon occurs.

(1-3) The control device 42 limits the time rate of change in the target value of the reverse control of the combination vehicle 10 from the viewpoint of achieving appropriate vehicle behavior. For example, the control device 42 executes the process of limiting the time rate of change in the target virtual steering angle $\alpha_2$*. The control device 42 sets the velocity limit value $\alpha_{2mx}(\cdot)$ for the target virtual steering angle velocity $\alpha_2*(\cdot)$ that is the time rate of change in the target virtual steering angle $\alpha_2$*. The target virtual steering angle velocity $\alpha_2*(\cdot)$ is limited to the velocity limit value $\alpha_{2mx}(\cdot)$. This suppresses the occurrence of the case where the target virtual steering angle $\alpha_2$* changes at a rate of change at which the virtual steering angle $\alpha_2$ that is the internal controlled variable of the control device 42 cannot follow the target virtual steering angle $\alpha_2$*. This suppresses the occurrence of the so-called overshoot in which the virtual steering angle $\alpha_2$ exceeds the target virtual steering angle $\alpha_2$*. Therefore, more appropriate vehicle behavior can be achieved.

The control device 42 calculates the velocity limit value $\alpha_{2mx}(\cdot)$ by substituting the value of the hitch angle velocity $\beta(\cdot)$ and the value of the maximum steering angle velocity $\alpha_{1mx}(\cdot)$ into the equation of motion for the virtual steering angle velocity $\alpha_2(\cdot)$. The velocity limit value $\alpha_{2mx}(\cdot)$ is the limit value for the target virtual steering angle velocity $\alpha_2*(\cdot)$. The equation of motion for the virtual steering angle velocity $\alpha_2(\cdot)$ is the above expression 4. The velocity limit value $\alpha_{2mx}(\cdot)$ is obtained by substituting the value of the hitch angle velocity $\beta(\cdot)$ obtained from the expression 2 for the hitch angle velocity $\beta(\cdot)$ in the expression 4 and substituting the value of the maximum steering speed $\alpha_{1mx}(\cdot)$ for the steering angle velocity $\alpha_1(\cdot)$.

(1-4) The control device 42 limits the time rate of change in the target value of the reverse control of the combination vehicle 10, for example, from the viewpoint of suppressing the occurrence of the jackknife phenomenon. For example, the absolute value of the steering angle velocity $\alpha_1(\cdot)$ and therefore the absolute value of the hitch angle velocity $\beta(\cdot)$ increase as the absolute value of the target virtual steering angle velocity $\alpha_2*(\cdot)$ increases. By limiting the target virtual steering angle velocity $\alpha_2*(\cdot)$, the hitch angle velocity $\beta(\cdot)$ is limited. This suppresses the occurrence of the case where the hitch angle $\beta$ exceeds the jackknife hitch angle $\beta_{jk}$. Further, a sudden increase in the absolute value of the hitch angle $\beta$ is suppressed. Thus, the occurrence of the jackknife phenomenon can be suppressed more appropriately during the execution of the reverse assist control for the combination vehicle 10. Therefore, more appropriate vehicle behavior can be achieved.

(1-5) When the operator specifies the target virtual steering angle $\alpha_2$* of the trailer 12 through the operation on the input device 41, the reverse movement of the trailer 12 in a nonlinear and unstable system can be controlled with the trailer 12 regarded as a single vehicle of the tractor 11 alone, that is, an ordinary-sized passenger car of front-wheel steering. Therefore, the reverse operation of the combination vehicle 10 can be assisted more appropriately. The operator can move the combination vehicle 10 in reverse with the same feeling as that in the case of an ordinary-sized passenger car.

Second Embodiment

Next, a second embodiment of the control device for the combination vehicle will be described. The present embodiment basically has the same configuration as the first embodiment shown in FIGS. 1 to 4. Therefore, detailed description will be omitted for the same members and configurations as those in the first embodiment. The present embodiment differs from the first embodiment in that the hitch angle $\beta$ is employed as the internal controlled variable of the control device 42 instead of the virtual steering angle $\alpha_2$.

The control device 42 includes the setting unit 42A and the control unit 42B. The setting unit 42A sets a target hitch angle $\beta$* of the trailer 12 based on the electric signal S1 generated by the input device 41, that is, the operation amount or the operation position of the dial 41A with respect to the reference position. The target hitch angle $\beta$* is a target value of the hitch angle $\beta$ of the trailer 12. The setting unit 42A calculates the target hitch angle $\beta$* corresponding to the operation amount or the operation position of the dial 41A, for example, using a map that defines the relationship between the operation amount or the operation position of the dial 41A and the target hitch angle $\beta$* of the trailer 12. The operator can specify the target hitch angle $\beta$* according to a desired reverse route for reversing the trailer 12 by operating the dial 41A.

The control unit 42B acquires the target hitch angle $\beta$* set by the setting unit 42A, the hitch angle $\beta$ detected by the hitch angle sensor 51, the vehicle speed V detected by the vehicle speed sensor 52, and the steering angle $\alpha_1$ detected by the steering angle sensor 30C.

The control unit 42B calculates the target steering angle $\alpha_1$* of the front wheels 11F of the tractor 11 based on the target hitch angle $\beta$ set by the setting unit 42A and the hitch angle $\beta$, the vehicle speed V, and the steering angle $\alpha_1$ detected by the sensors. The control unit 42B calculates the target steering angle $\alpha_1$* of the front wheels 11F so that the hitch angle $\beta$ of the trailer 12 converges to the target hitch angle $\beta$*. That is, the control unit 42B calculates the target steering angle $\alpha_1$* of the front wheels 11F by executing feedback control on the hitch angle $\beta$ of the trailer 12 so that the hitch angle $\beta$ agrees with the target hitch angle $\beta$*.

<Jackknife Suppression Process>

Next, the procedure of the jackknife suppression process will be described.

Figure 9:
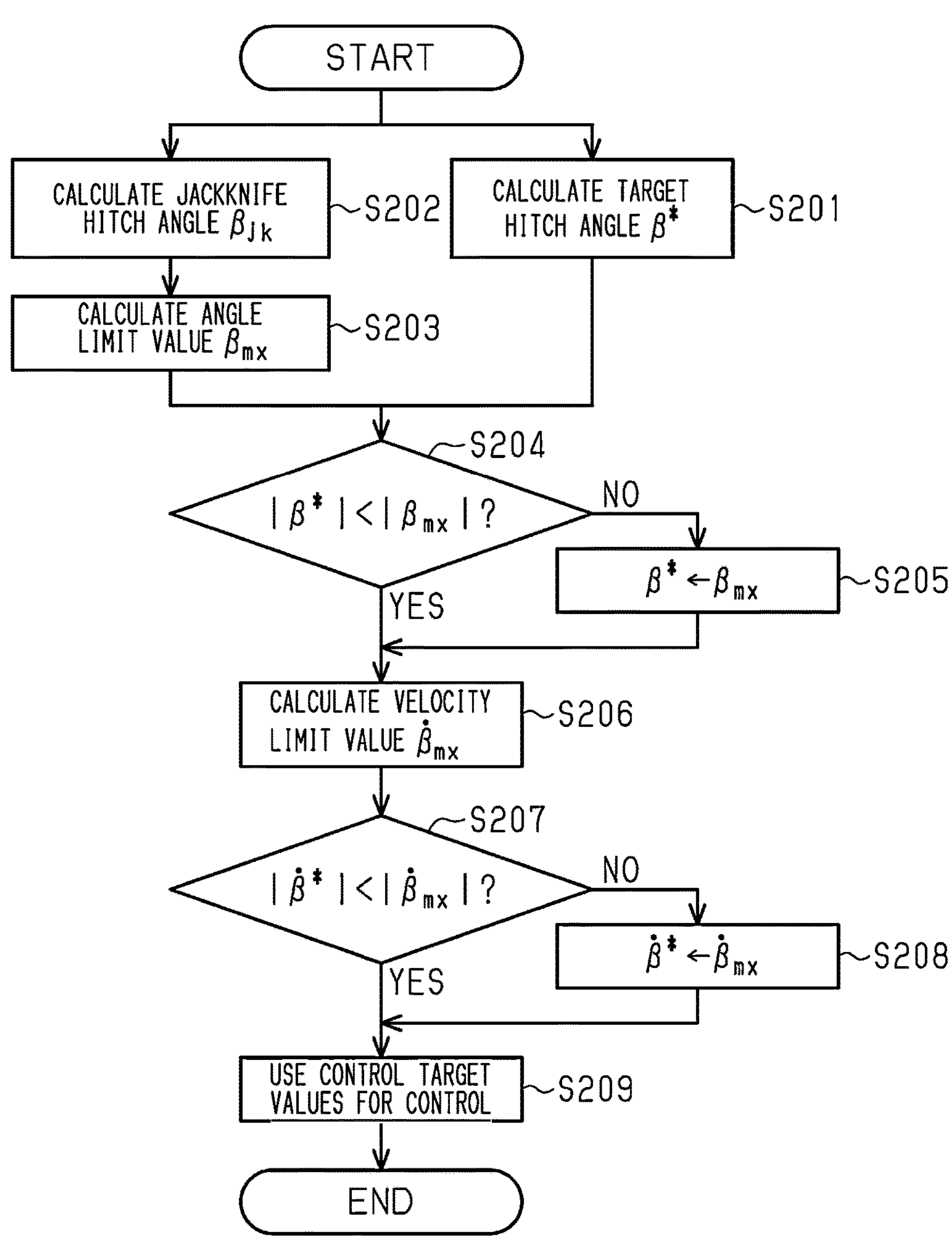
FIG. 9 is a flowchart showing the procedure of a process of limiting a control target value according to a second embodiment.

As shown in a flowchart of FIG. 9, the control unit 42B first calculates the target hitch angle $\beta^*$ (step S201). The target hitch angle $\beta^*$ is a target value of the hitch angle $\beta$ serving as a controlled variable.

The control unit 42B calculates the target hitch angle $\beta^*$, for example, based on the electric signal S1 generated by the input device 41, that is, the operation amount or the operation position of the dial 41A with respect to the reference position. The control unit 42B calculates the target hitch angle $\beta^*$ corresponding to the operation amount or the operation position of the dial 41A, for example, using a map that defines the relationship between the operation amount or the operation position of the dial 41A and the target hitch angle $\beta^*$.

The control unit 42B calculates the jackknife hitch angle $\beta_{jk}$ (step S202). The jackknife hitch angle $\beta_{jk}$ is a boundary value of the hitch angle $\beta$ as to whether the jackknife phenomenon occurs. The jackknife hitch angle $\beta_{jk}$ is physically defined as a hitch angle $\beta$ when the value of the hitch angle velocity $\beta(\cdot)$ that is the time rate of change in the hitch angle $\beta$ is "0" at the maximum steering angle $\alpha_{1mx}$ of the front wheel 11F of the tractor 11. The symbol "." represents a time derivative. The maximum steering angle $\alpha_{1mx}$ is the maximum value of the steering angle $\alpha_1$ of the front wheel 11F of the tractor 11 that can be taken physically.

The equation of motion for the hitch angle velocity $\beta(\cdot)$ is represented by the above expression 2. The control unit 42B substitutes the maximum steering angle $\alpha_{1mx}$ for the steering angle $\alpha_1$ and substitutes "0" for the hitch angle velocity $\beta(\cdot)$ in the expression 2. Then, the control unit 42B obtains the jackknife hitch angle $\beta_{jk}$ by solving the expression 2 for the hitch angle $\beta$.

The control unit 42B calculates an angle limit value $\beta_{mx}$ for the target hitch angle $\beta^*$ based on the jackknife hitch angle $\beta_{jk}$ calculated in step S202 (step S203). The angle limit value $\beta_{mx}$ includes an upper limit value $+\beta_{jk}$ that is a positive angle limit value, and a lower limit value $-\beta_{jk}$ that is a negative angle limit value. That is, the jackknife hitch angle $\beta_{jk}$ is set as the angle limit value $\beta_{mx}$.

Next, the control unit 42B determines whether the absolute value of the target hitch angle $\beta^*$ is smaller than the absolute value of the angle limit value $\beta_{mx}$ (step S204).

When the absolute value of the target hitch angle $\beta^*$ calculated in step S201 is not smaller than the absolute value of the angle limit value $\beta_{mx}$ (NO in step S204), the control unit 42B advances the process to step S205.

In step S205, the control unit 42B limits the target hitch angle $\beta$ calculated in step S201 to the angle limit value $\beta_{mx}$. The control unit 42B holds the target hitch angle $\beta^*$ limited to the angle limit value $\beta_{mx}$ as a final target hitch angle $\beta^*$ to be used for controlling the behavior of the combination vehicle 10.

When the absolute value of the target hitch angle $\beta^*$ calculated in step S201 is smaller than the absolute value of the angle limit value $\beta_{mx}$ (YES in step S204), the value of the target hitch angle $\beta^*$ calculated in step S201 is held as the final target hitch angle $\beta^*$ to be used for controlling the behavior of the combination vehicle 10.

Next, the control unit 42B calculates a velocity limit value $\beta_{mx}(\cdot)$ for a target hitch angle velocity $\beta^*(\cdot)$ (step S206). The target hitch angle velocity $\beta^*(\cdot)$ is a time rate of change in the target hitch angle $\beta^*$.

The equation of motion for the hitch angle velocity $\beta(\cdot)$ is represented by the above expression 2. From the viewpoint of limiting the hitch angle velocity $\beta(\cdot)$ to reduce the steering speed of the front wheel 11F of the tractor 11, the value of "tan $\alpha_1$" in the second term on the right side of the expression 2 including the steering angle $\alpha_1$ is limited. There is a correlation between the hitch angle velocity $\beta(\cdot)$ and the steering speed of the front wheel 11F.

When "$\alpha_1>0$", "tan($\alpha_1'$)" at the next time has the relationship shown in the following expression 5.

$$\tan\alpha_1' < \tan(\alpha_1 + \dot{\alpha}_{1mx} * dt) < \tan\alpha_{1mx} \quad \text{[Math. 5]}$$

where "$\alpha_{1mx}$" is the maximum steering angle of the front wheel 11F of the tractor 11, and "$\alpha_{1mx}(\cdot)$" is the maximum steering angle velocity that is a time rate of change in the maximum steering angle $\alpha_{1mx}$. The maximum steering angle velocity $\alpha_{1mx}(\cdot)$ is obtained by differentiating the maximum steering angle $\alpha_{1mx}$ of the front wheel 11F in terms of time. The symbol "$\alpha_{1mx}(\cdot)$*dt" is the maximum change amount of the steering angle $\alpha_1$ during a unit time dt. The unit time is an infinitesimal time, and is, for example, the calculation cycle of the control unit 42B. The symbol "*" represents multiplication, and "$\alpha_1+\alpha_{1mx}(\cdot)$*dt" is the maximum steering angle $\alpha_1$ that may change from the current steering angle $\alpha_1$ during the unit time dt, and is determined by the maximum steering speed $\alpha_{1mx}(\cdot)$ of the front wheel 11F.

The second or third term of the expression 5 is used as a constraint on "tan $\alpha_1$". The third term of the expression 5 is a stronger constraint than the second term. By substituting the second or third term of the expression 5 into the above expression 2, the velocity limit value $\beta_{mx}(\cdot)$ for the target hitch angle velocity $\beta^*(\cdot)$ is obtained.

Next, the control unit 42B determines whether the absolute value of the target hitch angle velocity $\beta^*(\cdot)$ is smaller than the absolute value of the velocity limit value $\beta_{mx}(\cdot)$ (step S207).

The target hitch angle velocity $\beta^*(\cdot)$ is obtained by substituting the value of the target hitch angle $\beta^*$ calculated in step S201 into the above expression 2.

When the absolute value of the target hitch angle velocity $\beta^*(\cdot)$ is not smaller than the absolute value of the velocity limit value $\beta_{mx}(\cdot)$ (NO in step S207), the control unit 42B advances the process to step S208.

In step S208, the control unit 42B limits the target hitch angle velocity $\beta^*(\cdot)$ that is based on the target hitch angle $\beta^*$ calculated in step S201 to the velocity limit value $\beta_{mx}(\cdot)$. The control unit 42B holds the target hitch angle velocity $\beta^*(\cdot)$ limited to the velocity limit value $\beta_{mx}(\cdot)$ as a final target hitch angle velocity $\beta^*(\cdot)$ to be used for controlling the behavior of the combination vehicle 10.

When the absolute value of the target hitch angle velocity $\beta^*(\cdot)$ is smaller than the absolute value of the velocity limit value $\beta_{mx}(\cdot)$ (YES in step S207), the control unit 42B holds the target hitch angle velocity $\beta^*(\cdot)$ that is based on the target hitch angle $\beta^*$ calculated in step S201 as the final target hitch angle velocity $\beta^*(\cdot)$ to be used for controlling the behavior of the combination vehicle 10.

The control unit 42B controls the behavior of the combination vehicle 10 using the final target hitch angle $\beta^*$ and the final target hitch angle velocity $\beta^*(\cdot)$ that are control target values (step S209).

<Behavior of Control Target Value>

Next, an example of the behavior of the target hitch angle $\beta^*$ that is the control target value will be described.

A comparative example in which the target hitch angle $\beta^*$ and the target hitch angle velocity $\beta^*(\cdot)$ are not limited will be discussed. In the comparative example, when a target hitch angle $\beta^*$ exceeding the absolute value of the angle limit value $\beta_{mx}$ is set through the operation on the dial 41A, the target hitch angle $\beta^*$ changes, for example, as follows.

As indicated by the characteristic line L1 in the graph of FIG. 6, when the reverse assist control is started (time $t_0$), the absolute value of the target hitch angle $\beta^*$ gradually increases from the initial value "0" toward a current set value $\beta_1^*$. The set value $\beta_1^*$ is a value exceeding the absolute value of the angle limit value $\beta_{mx}$. The absolute value of the target hitch angle $\beta^*$ increases, for example, at a target hitch angle velocity $\beta^*(\cdot)$ exceeding the velocity limit value $\beta_{mx}(\cdot)$. The target hitch angle velocity $\beta^*(\cdot)$ is the amount of change per unit time in the absolute value of the target hitch angle $\beta^*$, and indicates the slope of the characteristic line L1. The absolute value of the target hitch angle $\beta^*$ exceeds the absolute value of the angle limit value $\beta_{mx}$, and eventually reaches the current set value $\beta_1^*$ (time $t_1$).

The present embodiment in which the target hitch angle $\beta^*$ and the target hitch angle velocity $\beta^*(\cdot)$ are limited will be discussed. In the present embodiment, when a target hitch angle $\beta^*$ exceeding the absolute value of the angle limit value $\beta_{mx}$ is set through the operation on the dial 41A, the target hitch angle $\beta^*$ changes as follows.

As indicated by the characteristic line L2 in the graph of FIG. 6, when the reverse assist control is started (time $t_0$), the absolute value of the target hitch angle $\beta^*$ gradually increases from the initial value "0" toward the current set value $\beta_1^*$. The absolute value of the target hitch angle $\beta^*$ increases at the target hitch angle velocity $\beta^*(\cdot)$ limited to the velocity limit value $\beta_{mx}(\cdot)$. That is, the slope of the characteristic line L2 is smaller than the slope of the characteristic line L1. The absolute value of the target hitch angle $\beta^*$ eventually reaches the absolute value of the angle limit value $\beta_{mx}$ (time $t_2$). Although the current set value $\beta_1^*$ exceeds the absolute value of the angle limit value $\beta_{mx}$, the absolute value of the target hitch angle $\beta^*$ is kept limited to the absolute value of the angle limit value $\beta_{mx}$.

Functions of Second Embodiment

Next, functions of the second embodiment will be described. For example, the combination vehicle 10 turns to the right in reverse and then turns to the left in reverse. The turning radius of the reverse right turn is the same as the turning radius of the reverse left turn. When turning, a target steering angle $\alpha_1^*$ exceeding the maximum steering angle $\alpha_{1mx}$ that is the limit value of the physical movable range of the front wheel 11F of the tractor 11 is set through the operation on the dial 41A.

Figure 10:
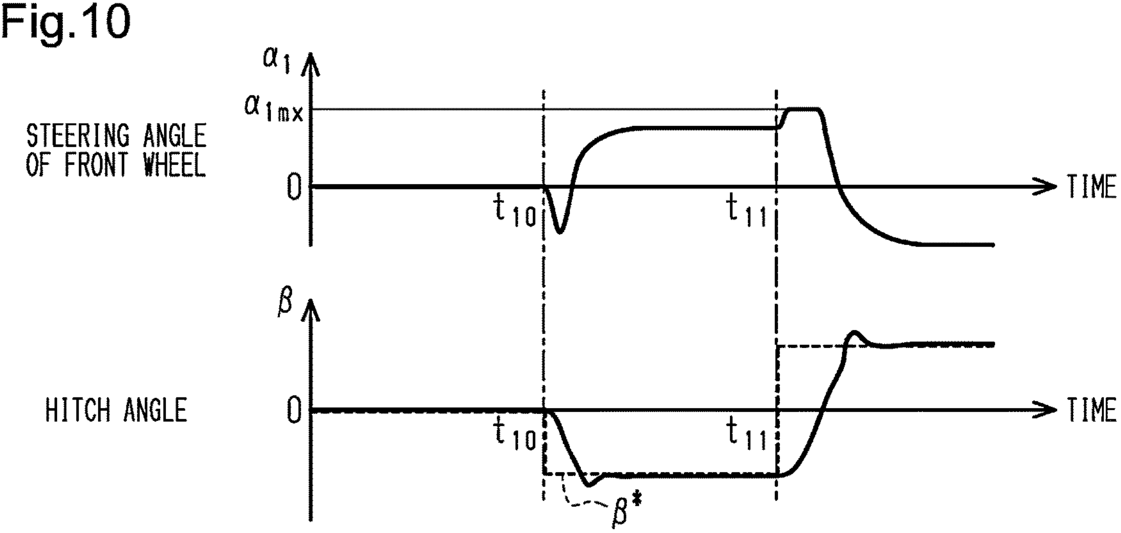
FIG. 10 is a diagram illustrating functions of the second embodiment, including graphs showing changes over time in steering angle of front wheels of a tractor in a comparative example and changes over time in hitch angle in the comparative example.

As shown in FIG. 10, along with the start of the reverse right turn of the combination vehicle 10 (time $t_{10}$), the steering angle $\alpha_1$ of the front wheel 11F of the tractor 11 changes in the negative direction and then gradually increases in the positive direction. The steering angle $\alpha_1$ eventually reaches a constant positive value. After the steering angle $\alpha_1$ reaches the constant positive value, the steering angle $\alpha_1$ is kept at the constant positive value for a predetermined period. The absolute value of the constant positive value is a value smaller than the absolute value of the maximum steering angle $\alpha_{1mx}$.

After the combination vehicle 10 finishes the reverse right turn, the combination vehicle 10 then starts the reverse left turn (time $t_{11}$). The steering angle $\alpha_1$ starts to increase again in the positive direction from the constant positive value smaller than the absolute value of the maximum steering angle $\alpha_{1mx}$. This is caused by, for example, a response delay in the steering angle $\alpha_1$ due to physical constraints on the combination vehicle 10. After the steering angle $\alpha_1$ reaches the maximum steering angle $\alpha_{1mx}$, the steering angle $\alpha_1$ then decreases in the negative direction and is kept at a constant negative value.

In the comparative example in which the target hitch angle velocity $\beta^*(\cdot)$ is not limited, the hitch angle $\beta$ changes as follows.

As shown in FIG. 10, in the comparative example, when the combination vehicle 10 starts the reverse right turn (time $t_{10}$), the hitch angle $\beta$ gradually increases in the negative direction along with the increase in the steering angle $\alpha_1$ in the positive direction. After the hitch angle $\beta$ exceeds the negative target hitch angle $\beta^*$ in the negative direction, the hitch angle $\beta$ then increases in the positive direction and eventually reaches the negative target hitch angle $\beta^*$. After the hitch angle $\beta$ reaches the negative target hitch angle $\beta^*$, the hitch angle $\beta$ is kept at the negative target hitch angle $\beta^*$ for a predetermined period.

After the combination vehicle 10 finishes the reverse right turn, the combination vehicle 10 then starts the reverse left turn (time $t_{11}$). The hitch angle $\beta$ gradually increases in the positive direction from the negative target hitch angle $\beta^*$. After the hitch angle $\beta$ exceeds the positive target hitch angle $\beta^*$ in the positive direction, the hitch angle $\beta$ then changes in the negative direction and eventually reaches the positive target hitch angle $\beta^*$. After the hitch angle $\beta$ reaches the positive target hitch angle $\beta^*$, the hitch angle $\beta$ is kept at the positive target hitch angle $\beta^*$.

As shown in FIG. 10, an overshoot of the hitch angle $\beta$ occurs in the comparative example. The overshoot is a phenomenon in which the hitch angle $\beta$ that is the controlled variable exceeds the target hitch angle $\beta^*$ that is the target value. Due to the physical constraints on the combination vehicle 10, there is a response delay in the steering angle $\alpha_1$ and the hitch angle $\beta$. Therefore, when the target steering angle $\alpha_1^*$ changes suddenly, there is a possibility that the steering angle $\alpha_1$ cannot follow the change in the target steering angle $\alpha_1^*$. When the target hitch angle $\beta^*$ changes suddenly, there is a possibility that the hitch angle $\beta$ cannot follow the change in the target hitch angle $\beta^*$.

Next, the present embodiment in which the target hitch angle velocity $\beta^*(\cdot)$ is limited will be discussed. In the present embodiment, the steering angle $\alpha_1$ and the hitch angle $\beta$ change as follows. The preconditions such as the turning direction of the combination vehicle 10 and the amount of operation on the dial 41A are the same as those in the comparative example. That is, the combination vehicle 10 turns to the right in reverse and then turns to the left in reverse. The turning radius of the reverse right turn is the same as the turning radius of the reverse left turn. When turning, a target steering angle $\alpha_1^*$ exceeding the maximum steering angle $\alpha_{1mx}$ that is the limit value of the physical movable range of the front wheel 11F of the tractor 11 is set through the operation on the dial 41A.

Figure 11:
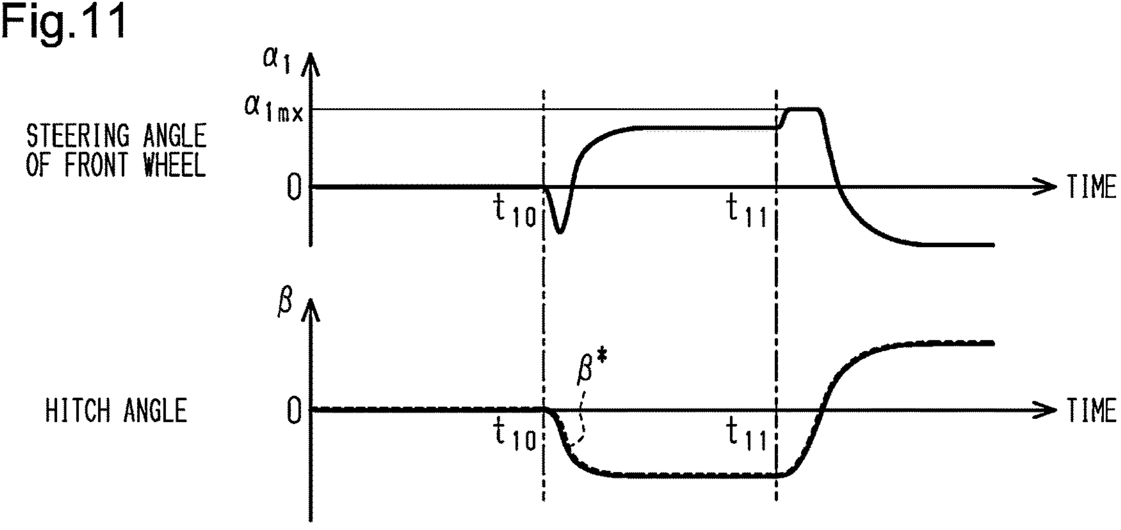
FIG. 11 is a diagram illustrating the functions of the second embodiment, including graphs showing changes over time in steering angle of front wheels of a tractor in the second embodiment and changes over time in hitch angle in the second embodiment.

As shown in FIG. 11, the steering angle $\alpha_1$ changes in the same manner as in the comparative example shown in FIG. 10. As shown in FIG. 11, along with the increase in the steering angle $\alpha_1$ in the positive direction, the hitch angle $\beta$ gradually increases in the negative direction and eventually reaches the negative target hitch angle $\beta^*$. Unlike the comparative example shown in FIG. 10, the hitch angle $\beta$ does not exceed the negative target hitch angle $\beta$ in the negative direction. After the hitch angle $\beta$ reaches the negative target hitch angle $\beta^*$, the hitch angle $\beta$ is kept at the negative target hitch angle $\beta^*$ for a predetermined period.

After the combination vehicle 10 finishes the reverse right turn, the combination vehicle 10 then starts the reverse left turn (time $t_{11}$). The hitch angle $\beta$ gradually increases in the positive direction from the negative target hitch angle $\beta^*$ and eventually reaches the positive target hitch angle $\beta^*$. Unlike the comparative example shown in FIG. 10, the hitch angle $\beta$ does not exceed the positive target hitch angle $\beta^*$ in the positive direction. After the hitch angle $\beta$ reaches the positive target hitch angle $\beta^*$, the hitch angle $\beta$ is kept at the positive target hitch angle $\beta^*$.

Effects of Second Embodiment

The second embodiment has the following effects.

(2-1) The control device 42 limits the target value of the reverse control of the combination vehicle 10 from the viewpoint of achieving appropriate vehicle behavior. For example, the control device 42 executes the process of limiting the target hitch angle $\beta^*$ that is the target value of the reverse control of the combination vehicle 10. The control device 42 sets the angle limit value $\beta_{mx}$ for the target hitch angle $\beta^*$. By limiting the target hitch angle $\beta^*$ to the angle limit value $\beta_{mx}$, it is possible to suppress the calculation of the target hitch angle $\beta^*$ having an excessively large value that exceeds the angle limit value $\beta_{mx}$. Therefore, more appropriate vehicle behavior can be achieved.

(2-2) The control device 42 limits the target value of the reverse control of the combination vehicle 10, for example, from the viewpoint of suppressing the occurrence of the jackknife phenomenon. For example, the absolute value of the hitch angle $\beta$ increases as the absolute value of the target hitch angle $\beta^*$ increases. By limiting the absolute value of the target hitch angle $\beta^*$, it is possible to limit the absolute value of the hitch angle $\beta$. This suppresses the occurrence of the case where the absolute value of the hitch angle $\beta$ exceeds the absolute value of the jackknife hitch angle $\beta_{jk}$. Thus, the occurrence of the jackknife phenomenon can be suppressed during the execution of the reverse assist control for the combination vehicle 10. Therefore, more appropriate vehicle behavior can be achieved.

The control device 42 calculates the jackknife hitch angle $\beta_{jk}$ by substituting zero for the value of the hitch angle velocity $\beta(\cdot)$ and the maximum steering angle $\alpha_{1mx}$ for the value of the steering angle $\alpha_1$ of the front wheel 11F in the equation of motion for the hitch angle velocity $\beta(\cdot)$ and solving the equation of motion after the substitution in terms of the hitch angle $\beta$. The equation of motion for the hitch angle velocity $\beta(\cdot)$ is the above expression 2. The control device 42 sets the jackknife hitch angle $\beta_{jk}$ as the angle limit value $\beta_{mx}$ that is the limit value for the target hitch angle $\beta^*$.

(2-3) The control device 42 limits the time rate of change in the target value of the reverse control of the combination vehicle 10 from the viewpoint of achieving appropriate vehicle behavior. For example, the control device 42 executes the process of limiting the time rate of change in the target hitch angle $\beta^*$. The control device 42 sets the velocity limit value $\beta_{mx}(\cdot)$ for the target hitch angle velocity $\beta^*(\cdot)$ that is the time rate of change in the target hitch angle $\beta^*$. The target hitch angle velocity $\beta^*(\cdot)$ is limited to the velocity limit value $\beta_{mx}(\cdot)$. This suppresses the occurrence of the case where the target hitch angle $\beta^*$ changes at a rate of change at which the hitch angle $\beta$ that is the internal controlled variable of the control device 42 cannot follow the target hitch angle $\beta^*$. This suppresses the occurrence of the so-called overshoot in which the hitch angle $\beta$ exceeds the target hitch angle $\beta^*$. Therefore, more appropriate vehicle behavior can be achieved.

The control device 42 calculates the velocity limit value $\beta_{mx}(\cdot)$ by substituting the value of the maximum steering angle $\alpha_{1mx}$ of the front wheel 11F that can be taken physically or the value of the maximum steering angle $\alpha_1$ of the front wheel 11F that may change from the current steering angle $\alpha_1$ during the unit time dt into the equation of motion for the hitch angle velocity $\beta(\cdot)$. The velocity limit value $\beta_{mx}(\cdot)$ is the limit value for the time rate of change in the target hitch angle $\beta^*$. The equation of motion for the hitch angle velocity $\beta(\cdot)$ is the above expression 2. By substituting the second or third term of the expression 5 for "tan $\alpha_1$" in the expression 2, the velocity limit value $\beta_{mx}(\cdot)$ is obtained. The substitution of the second term of the expression 5 for "tan $\alpha_1$" in the expression 2 is equivalent to substitution of the maximum steering angle $\alpha_1$ that may change from the current steering angle $\alpha_1$ during the unit time dt ($=\alpha_1+\alpha_{1mx}(\cdot)*dt$) for "$\alpha_1$" in the expression 2. The substitution of the third term of the expression 5 for "tan $\alpha_1$" in the expression 2 is equivalent to substitution of the maximum steering angle $\alpha_{1mx}$ of the front wheel 11F that can be taken physically for "$\alpha_1$" in the expression 2.

(2-4) The control device 42 limits the time rate of change in the target value of the reverse control of the combination vehicle 10, for example, from the viewpoint of suppressing the occurrence of the jackknife phenomenon. For example, the absolute value of the hitch angle velocity $\beta(\sim)$ increases as the absolute value of the target hitch angle velocity $\beta^*(\cdot)$ increases. By limiting the target hitch angle velocity $\beta^*(\cdot)$, the hitch angle velocity $\beta(\cdot)$ is limited. This suppresses the occurrence of the case where the hitch angle $\beta$ exceeds the jackknife hitch angle $\beta_{jk}$. Thus, the occurrence of the jackknife phenomenon can be suppressed more appropriately during the execution of the reverse assist control for the combination vehicle 10. Therefore, more appropriate vehicle behavior can be achieved.

(2-5) When the operator specifies the target hitch angle $\beta^*$ of the trailer 12 through the operation on the input device 41, the reverse movement of the trailer 12 in the nonlinear and unstable system can be controlled. Therefore, the reverse operation of the combination vehicle 10 can be assisted more appropriately.

OTHER EMBODIMENTS

The first and second embodiments may be modified as follows.

The control device 42 may display various types of information on the screen of the display device 20 during the execution of the reverse assist control for the combination vehicle. The control device 42 displays, for example, at least one of the following pieces of information (B1) to (B3) on the screen of the display device 20.

(B1) Limit Value for Control Target Value

The control device 42 may display the limit value for the control target value on the screen of the display device 20. In the first embodiment, the control device 42 causes the screen of the display device 20 to numerically display the angle limit value $\alpha_{2mx}$ that is the limit value for the target virtual steering angle $\alpha_2^*$. In the second embodiment, the control device 42 causes the screen of the display device 20 to numerically display the angle limit value $\beta_{mx}$ for the target hitch angle $\beta^*$.

(B2) Limit Range of Control Target Value

In the first embodiment, the control device 42 may cause the screen of the display device 20 to visually display the range in which the target virtual steering angle $\alpha_2^*$ is limited. For example, the angle range in which the target virtual steering angle $\alpha_2^*$ is limited is visually displayed using two straight lines provided at the hitch point $C_1$ as the center therebetween. In the second embodiment, the control device 42 may cause the screen of the display device 20 to display the range in which the target hitch angle $\beta^*$ is limited. For example, the angle range in which the target hitch angle $\beta^*$ is limited is visually displayed using two straight lines provided at the hitch point $C_1$ as the center therebetween.

(B3) Virtual Steering Angle

The control device 42 may cause the screen of the display device 20 to display, for example, a trailer model regarded as a single vehicle including virtual front wheels. The control device 42 shifts the virtual front wheels of the trailer model in response to changes in the virtual steering angle $\alpha_2$.

In the first embodiment, for example, when the difference between the value of the target virtual steering angle $\alpha_2^*$ and the angle limit value $\alpha_{2mx}$ reaches a value smaller than a first threshold value, the operator of the combination vehicle 10 may be notified about such an event. In the second embodiment, when the difference between the value of the target hitch angle $\beta^*$ and the angle limit value $\beta_{mx}$ reaches a value smaller than a second threshold value, the operator of the combination vehicle 10 may be notified about such an event. For example, the control device 42 visually notifies the operator of the combination vehicle 10 via the display device 20. The control device 42 may auditorily notify the operator of the combination vehicle 10 via an in-vehicle speaker.

Figure 12:
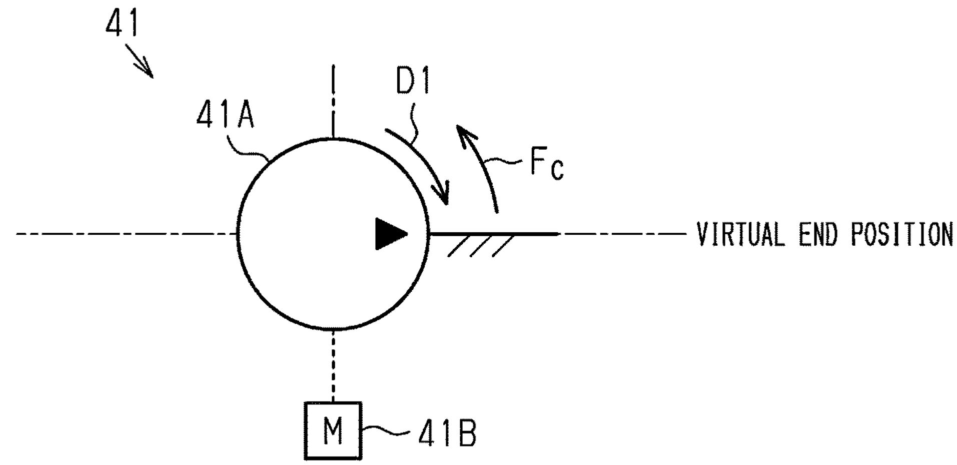
FIG. 12 is a front view of a dial according to another embodiment.

The control device 42 may notify the operator of the combination vehicle 10 using his/her tactile sense that the control target value is approaching the limit value. As shown in FIG. 12, the input device 41 includes, for example, a motor 41B. The motor 41B is connected to the dial 41A. The control device 42 applies torque to the dial 41A through control on the motor 41B. For example, the control device 42 applies a reaction force $F_c$ to the dial 41A when the control target value approaches the limit value. The time when the control target value approaches the limit value is, for example, the time when the difference between the control target value and the limit value reaches a value smaller than a predetermined threshold value. The reaction force $F_c$ is a force in a direction opposite to an operation direction D1 of the dial 41A. The control device 42 may gradually increase the value of the reaction force $F_c$ as the control target value approaches the limit value. The control device 42 may apply, to the dial 41A, a reaction force $F_c$ that brings difficulty in rotating the dial 41A at the timing when the control target value reaches the limit value. The dial 41A is held at a virtual end position that is the limit position of a virtual operation range.

As in the first and second embodiments, when a steering mechanism of a type that connects the front wheels 11F and the steering wheel so that power can be transmitted therebetween is employed as the steering mechanism of the tractor 11, the following configuration may be employed as the input device 41. For example, a configuration including a slider may be employed instead of the dial 41A. The slider may be a dedicated item for specifying the reverse direction or the reverse route of the combination vehicle 10, or may be a slider for operating other in-vehicle devices. In the case of the slider for operating other in-vehicle devices, the function of the slider is switched to a function as the input device 41 when the reverse assist function of the combination vehicle 10 is switched from OFF to ON.

In the first and second embodiments, a steer-by-wire type steering mechanism in which power transmission between the front wheels 11F and the steering wheel is disconnected may be employed as the steering mechanism of the tractor 11. In this case, the steering wheel may be used as the input device 41. This is because the front wheels 11F and the steering wheel can be operated independently of each other. The front wheels 11F of the tractor 11 are steered by driving a steering motor. In this case, the function of the steering wheel is switched to the function as the input device 41 when the reverse assist function of the combination vehicle 10 is switched from OFF to ON. The operator specifies the reverse direction or the reverse route of the combination vehicle 10 by operating the steering wheel.

The trailer 12 can be regarded as a single vehicle including virtual front wheels. An automated reverse system for the combination vehicle 10 can be constructed by utilizing this feature. For example, in the first embodiment, known automated parking control for ordinary-sized passenger cars can be applied to the automated reverse control for the trailer 12 in consideration of the fact that the internal controlled variable of the control device 42 is the virtual steering angle $\alpha_2$ of the trailer 12. Therefore, there is no need to develop novel control for causing the trailer 12 to follow a target trajectory.

The invention claimed is:

1. A control device for a combination vehicle including a tractor including a steered wheel that is a wheel configured to change a direction of travel of the vehicle, and a trailer towed by the tractor, the control device comprising a control unit configured to, when a reverse operation of the combination vehicle is performed, assist a reverse operation of the trailer by causing a controlled variable to follow a target value of reverse control that is set through a specific operation by an operator, wherein the control unit is configured to execute a process of limiting the target value and a process of limiting a time rate of change in the target value from a viewpoint of achieving appropriate vehicle behavior, the target value is a target virtual steering angle that is a target value of a virtual steering angle of a virtual steered wheel of the trailer when the trailer is regarded as a single vehicle, and the control unit is configured to calculate a limit value for a time rate of change in the target virtual steering angle by substituting, into an equation of motion for a virtual steering angle velocity that is a time rate of change in the virtual steering angle, a value of a hitch angle velocity that is a time rate of change in a hitch angle that is an angle between a central axis extending in a longitudinal direction of the tractor and a central axis extending in a longitudinal direction of the trailer, and a value of a maximum steering angle velocity that is a time rate of change in a maximum steering angle that is a maximum value of a physically possible steering angle of the steered wheel.

2. The control device for the combination vehicle according to claim 1, wherein the control unit is configured to execute the process of limiting the target value and the process of limiting the time rate of change in the target value from a viewpoint of suppressing occurrence of a jackknife phenomenon.

3. The control device for the combination vehicle according to claim 1, wherein the control unit is configured to calculate a limit value for the target virtual steering angle by substituting, into an equation of motion for the virtual steering angle, a value of a jackknife hitch angle that is a boundary value of the hitch angle as to whether a jackknife phenomenon occurs, and a value of the maximum steering angle that is the maximum value of the physically possible steering angle.

* * * * *